(12) United States Patent
Height et al.

(10) Patent No.: US 11,486,087 B2
(45) Date of Patent: Nov. 1, 2022

(54) FUNCTIONAL THERMO-REGULATING TEXTILE ADDITIVES AND USES THEREOF

(71) Applicant: HeiQ Materials AG, Schlieren (CH)

(72) Inventors: Murray Height, Newtown (AU); Helmut Sieber, Rheinfelden (DE)

(73) Assignee: HeiQ Materials AG, Schlieren (CH)

( * ) Notice: Subject to any disclaimer, the term of this patent is extended or adjusted under 35 U.S.C. 154(b) by 93 days.

(21) Appl. No.: 16/759,780

(22) PCT Filed: Oct. 25, 2018

(86) PCT No.: PCT/EP2018/079282
§ 371 (c)(1),
(2) Date: Apr. 28, 2020

(87) PCT Pub. No.: WO2019/086322
PCT Pub. Date: May 9, 2019

(65) Prior Publication Data
US 2021/0372038 A1  Dec. 2, 2021

(30) Foreign Application Priority Data
Oct. 30, 2017 (EP) .................................. 17199191

(51) Int. Cl.
*D06M 15/53* (2006.01)
*C09D 171/02* (2006.01)

(52) U.S. Cl.
CPC .......... *D06M 15/53* (2013.01); *C09D 171/02* (2013.01)

(58) Field of Classification Search
CPC .................................................... D06M 15/53
USPC ........................................................ 524/612
See application file for complete search history.

(56) References Cited

U.S. PATENT DOCUMENTS

| 4,043,344 A | * | 8/1977 | Landi .................... A61L 17/145 606/230 |
| 5,622,649 A | | 4/1997 | Hunter et al. |
| 6,001,343 A | | 12/1999 | Trinh et al. |
| 2011/0250409 A1 | | 10/2011 | Marte et al. |

FOREIGN PATENT DOCUMENTS

| EP | 0013820 A1 | 8/1980 |
| EP | 0327091 A2 | 8/1989 |
| GB | 1584803 | 2/1981 |
| GB | 1584803 A * | 2/1981 ........... A61L 17/145 |
| WO | 9823809 A1 | 6/1998 |
| WO | 2004069955 A1 | 8/2004 |
| WO | 2017072012 A1 | 4/2017 |

OTHER PUBLICATIONS

Crespy et al., "Temperature-Responsive Polymers With LCST in the Physiological Range and Their Applications in Textiles", Polymer International, 2007, vol. 56, pp. 1461-1468.
Alexandridis et al., "Poly(ethylene oxide)/ Poly(propylene oxide) Block Copolymer Surfactants", Current Opinion in Colloid & Interface Science, 1997, vol. 2, pp. 478-489.

* cited by examiner

Primary Examiner — Hui H Chin
(74) Attorney, Agent, or Firm — The Webb Law Firm (57) ABSTRACT

Provided herein is a formulation containing a PPG/PEG block-copolymer (I) on average having PEG-blocks in the range of 37-45 terminated on both sides with on average in the range of 6-11 PPG blocks. The PPG/PEG block-copolymer can be end capped with hydrocarbon systems like for example n-butyl. The PPG/PEG block-copolymer (I) is chosen to have a DSC-melting point according to DIN ISO 11357 in the range of 15-37° C. to provide for a cool touch effect and can be applied without encapsulation. Furthermore uses of such a formulation and textiles treated with such a formulation are proposed.

29 Claims, 4 Drawing Sheets

FUNCTIONAL THERMO-REGULATING TEXTILE ADDITIVES AND USES THEREOF

CROSS-REFERENCE TO RELATED APPLICATIONS

This application is the United States national phase of International Application No. PCT/EP2018/079282 filed Oct. 25, 2018, and claims priority to European Patent Application No. 17199191.2 filed Oct. 30, 2017, the disclosures of which are hereby incorporated by reference in their entirety.

TECHNICAL FIELD

The present invention relates to new functional additives for fibers and resulting textiles, in particular to thermo-regulating additives. It furthermore relates to processes to coat fibers with the corresponding additives, uses of the additives and fibers and textiles provided with coatings of such additives.

PRIOR ART

Imparting particular properties to fibers is a continuing challenge in the textile industry, imparting color being the most obvious property. Modern textiles are provided with coatings for various effects, including for example non-ironing properties to the resulting textile, anti-microbial properties, flame retardant properties, but also touch and feel properties, humidity management and the like.

To achieve this one possibility is the encapsulation of additives, which as such is well known and established in the textile industry. One system for encapsulation is by way of melamine-formaldehyde, allowing for example the encapsulation of functional additives, including thermo-regulators.

To achieve the desired effect the encapsulation of large amounts of the functional additives is normally required. For example, for the encapsulation of thermo-regulator additives such as a specific wax, for example paraffin, calls for a high loading with the corresponding encapsulated particles. The large amount to be lastingly loaded onto the fibers is a continuing challenge.

Furthermore, there are serious disadvantages associated with the encapsulation technique. On the one hand the difficulty of applying the required high quantities of the functional additive in encapsulated form, basically requiring a particularly high amount of particles to be coated onto the fibers, but also the modification of the final fiber properties due to the high loading of the coating. Problems can be increased stiffness of the fibers, mitigation of the color effect of the basic fiber, touch and feel changes. To overcome these problems again further corrective additives have to be used, again increasing the coating load on the fiber. What's more, depending on the functional additive to add to the fibers and the corresponding encapsulation formulation, largely incompatible chemistries must be combined resulting in unstable formulations, which again need to be stabilized by corresponding additives. For example for the specific melamine-formaldehyde based encapsulation system the corresponding formulations are prone to sedimentation, either requiring to work at high viscosities or to use particular stabilization additives in the formulation.

To give examples, WO-A-2017072012 discloses particular melamine-formaldehyde based encapsulated systems. A process for treating a substrate, being a fabric or leather, is proposed, where a homogenous mixture of particles based on a maleimide polymer comprising a thermo-regulator additive is applied to a substrate and subsequently dried on it.

WO-A-9823809 discloses the impregnation of a fabric made of cellulose fibers, preferably cotton fibers with a dilute solution of polyethylene glycol, drying and curing the polyethylene glycol onto the fabric to give a final pick-up of 0.5 to 8% polyethylene glycol. Fabric treated with this pick-up of polyethylene glycol permanently bonded onto the fabric can be cotton and can have improved cooling properties similar to fabric made of linen due to humidity evaporation and non-iron properties (the latter is the effect coming from the crosslinking agent used to bond the polyethylene glycol to the cotton, as is industrial standard).

GB 1 584 803 discloses a surgical suturing material characterised by a multi-filament polymer strand. In order to improve the knot running properties and the handling, the strand is provided with a thin, greasy coating. The coating comprises a greasy, biologically absorbable copolymer having polyoxyethylene blocks and polyoxypropylene blocks. The copolymer has a molecular weight such that it is pasty to solid at 25 DEG C.

Crespy et al (Polym Im 56:1461-1468 (2007)) point out the academic and industrial research sustaining large efforts to synthesize and develop environmentally responsive smart materials. Temperature-responsive materials with a trigger temperature in the physiological range attract much attention due to their potential biomedical applications. They describe their chemistry and the way to synthesize them, focusing on applications for smart clothing fabrication.

Alexandridis et al (Current Opinion in Colloid & Interface Science 1997, 2:478-489) describe that block copolymers consisting of poly(ethylene oxide) (PEO) and poly(propylene oxide) (PPO) can self-assemble in water and water/oil mixtures (where water is a selective solvent for PEO and oil a selective solvent for PP) to form thermodynamically stable spherical micelles as well as an array of lyotropic liquid crystalline mesophases of varying morphology. The review significant advances which have been made on the identification of different morphologies, the delineation of the composition-temperature ranges where they occur, and the structural characterization of the morphologies using primarily small angle scattering techniques. Important new findings on the copolymer micellization in water as affected by cosolutes, and on the time-dependency of the surface activity are also reported.

US-A-2011250409 discloses a multifunctional, responsive functional layer on a substrate, such as textiles, paper and plastic materials, which includes at least one first and a second functional component, of which at least one of the second functional components meets the chemical-functional and constitutional specification for responsive behavior and thereby can be reversibly switched by an outer stimulus. The first and second functional components differ with respect to the intrinsically specified properties thereof and are matched to each other, wherein at least one of the functional components on the substrate is present as a physical-chemical compound. Methods are disclosed for producing the multifunctional, responsive functional layer, which enable the combination of functions, such as moisture management, soil release, antistatic, hydrophobicity, hydrophilicity, oleophobicity, controlled release, and conductivity.

SUMMARY OF THE INVENTION

It is therefore an object of the present invention to provide improved functional additives, in particular for thermo-regulation, to provide cool-touch properties to textiles/fibers coated therewith.

This object is achieved by the subject matter of the claims.

A textile treatment formulation is proposed according to the present invention containing (an effective amount of) a PPG/PEG block-copolymer (I), on average having PEG-blocks in the range of 37-45, terminated on both sides with on average in the range of 6-11 PPG blocks. The PPG/PEG block-copolymer should be end capped with hydrocarbon systems like for example n-butyl on one or both sides. The PPG/PEG block-copolymer (I) is chosen to have a DSC-melting point according to DIN ISO 11357 in the range of 15-37° C. to provide for a cool touch effect and can be applied without encapsulation. Furthermore uses of such a formulation and textiles treated with such a formulation are proposed.

Possible are for example systems of the type (PPG-500)-(PEG-1800)-(PPG-500), wherein the numbers stand for the molecular weight and not for the number of blocks. The corresponding backbone systems are also known as Meroxapol (International Nomenclature of Cosmetic Ingredients, INCI nomenclature). The term "Meroxapol" denotes a block copolymer consisting of polyethylene glycol terminated with polypropylene glycol. The numerical suffix designation is obtained by the following rule: The first two digits multiplied by 100 correspond to the approximate average molecular mass of the poly(oxypropylene) portion; the third digit multiplied by 10 corresponds to the percentage by weight of the poly(oxyethylene) portion. Suitable in the present context are systems like Meroxapol 86, 87, 96, 97, 106, 107, 116, 117, 126, 127 and/or Meroxapol 252, preferably endcapped at least on one side with a hydrocarbon chain with 1-18, preferably 1-6 carbon atoms.

More specifically, according to a first aspect, the present invention relates to a textile treatment formulation containing (an effective amount of) the following PPG/PEG block-copolymer (I):

In this formula (I), the variables are chosen as follows:

the average value of x is in the range of 27-63, preferably 37-45;

the average value of y is in the range of y is in the range of 6-11, wherein the value of y in the left and in the right structural moiety as represented above can be different but within that range;

R' and R" are selected, independently from each other, from the group consisting of: hydrogen, saturated or at least partly unsaturated linear, cyclic or branched hydrocarbon chain with 1-18, preferably 1-6 carbon atoms, in which one or more carbon atoms can be replaced by a heteroatom selected from the group consisting of: nitrogen, oxygen, sulfur.

When talking about the average value of x and y, this is a mass average which is back calculated from the average mass using the molecular weight of the corresponding structural moiety. The average molecular weight of the structure without the residues R' and R" is typically in the range of 2600-3100 Dalton (unified atomic mass unit, Da), preferably in the range of 2700-2900 Da.

The PPG/PEG block-copolymer (I) in the formulation can be one single system with essentially the same set of parameters as defined above, it can however also be a mixture of such PPG/PEG block-copolymers (I) provided that each of the constituents is in line with the definitions as given above and that this mixture as a whole has a melting temperature in the above-mentioned range.

To provide the desired functionality of the cool-touch effect, the parameters are furthermore chosen such that the PPG/PEG block-copolymer (I) has a DSC-melting point according to DIN ISO 11357 in the range of 15-37° C.

According to a first preferred embodiment, the average value of x is in the range of 38-42, preferably in the range of 39-41. It was found that an average value of approximately 40 provides for optimum melting point conditions for optimum cool touch effects.

According to yet another preferred embodiment, wherein the average value of y is in the range of 7-10, preferably in the range of 8-9, and wherein further preferably the values of y in the left and in the right structural moiety as represented above are the same.

As a matter of fact, the balance between the PPG/PEG blocks and their length is used to adjust the melting point into the desired range and to make sure the corresponding molecule can be attached to the fibers/textiles efficiently.

Such a formulation cannot contain the PPG/PEG block-copolymer (I) without end capping, i.e. with R'=R"=H; it should be end capped at one or both ends. Correspondingly, according to yet another preferred embodiment, R' and R" are selected, independently from each other, from the group consisting of: hydrogen, methyl, ethyl, n-propyl, iso-propyl, n-butyl, iso-butyl, sec-butyl, tert-butyl, n-pentyl, 2-pentyl, 3-pentyl, 2-methylbutyl, 3-methylbutyl, 3-methylbut-2-yl, 2-methylbut-2-yl, 2,2-dimethylpropyl. For the longer chain possibility R' and R" can be selected, independently from each other, from the group consisting of heptyl, octyl, nonyl, decyl, undecyl, dodecyl, tridecyl, tetradecyl, pentadecyl, hexadecyl, heptadecyl, octadecyl, wherein these can be saturated or partly unsaturated, cyclic, linear or branched, preferably they are saturated and linear with no substitution of the carbon atoms.

Particularly beneficial properties, for example for making sure that even difficult textiles/fibers such as cotton can be treated, can be achieved if R' and R" are selected, independently from each other, from the group consisting of: hydrogen, n-butyl, wherein preferably R' is selected to be n-butyl and R" is selected to be hydrogen for example for cotton treatment.

According to another preferred embodiment, the PPG/PEG block-copolymer (I) has a DSC-melting point according to DIN ISO 11357 in the range of 20-35° C., preferably in the range of 25-33° C. This temperature window was found to be optimum for the actual cool touch effect.

The total average molecular weight of the PPG/PEG block-copolymer (I) can be in the range of 2500-3200 Da, preferably in the range of 2750-3000 Da.

In particular if R' is selected to be n-butyl and R" is selected to be hydrogen, the average molecular weight can be in the range of 2750-2950 Da, and if R'=R" and selected to be n-butyl, the average molecular weight can be in the range of 2800-3000 Da.

One of the advantages of the present invention is that the PPG/PEG block-copolymer (I) can be present in the formulation in unencapsulated form.

The PPG/PEG block-copolymer (I) can be present in the formulation, preferably in the form of particles/droplets in an aqueous dispersion/suspension and/or in solution, in a concentration in the range of 50-850 g/l, preferably in the range of 100-830 g/l, most preferably in a concentration in the range of 100-810 or 700-810 g/l. Below the loading is too low for reasonably applying the formulation to the fibres and above viscosity becomes an issue. The aqueous solution may contain, next to water, other liquid organic solvents if needed, for example alcohols and the like but also preservatives, and minor amounts of less than 5 weight percent. Normally, the formulation is free from curing agents so that after drying of a correspondingly coated fiber no curing step is necessary.

Next to the PPG/PEG block-copolymer (I) the aqueous solution may contain at least one of the following additional constituents in the given amounts: rheology modifiers, stabilizers, antioxidants, glyoxal resins (preferably the low formaldehyde or formaldehyde-free types, with or without build-in catalyst system), e.g. glyoxal resins in a concentration in the range of 100-600 g/l and cross-linkers such as blocked isocyanate crosslinkers, e.g. in a concentration in the range of 100-400 g/l. If the formulation contains a glyoxal resin or a blocked isocyanate crosslinker it has to be cured after drying.

The PPG/PEG block-copolymer can be present in textile treatment liquors, preferably as an aqueous formulation, together with wetting and re-wetting agents, pH modifiers and buffers, de-foamers, antimicrobials, antioxidants, softeners, stiffeners, functional polymer emulsions, dyestuff fixing agents, glyoxal or melamine resins and their catalysts, blocked isocyanate crosslinkers, rheology modifiers and other textile finishing auxiliaries found in the market in the usual concentrations found in the textile field.

Furthermore the present invention relates to the use of a formulation as described above for the coating of fibers and/or textiles. For example the fibers and/or textiles can be based on cotton, hemp, flax, lyocell, rayon, jute, wool, polyester, polyamide, modacrylic, olefinic, acrylic. The fibers can also be based on mixtures of these materials, meaning that for example there is a mixture of cotton and lyocell fibers. Alternatively or in addition to that it's possible to have blends of these materials as a basis for the fibers, so for example the fibers can be based on a blend of cotton with polyester or of polyamide with polyester, also possible are bi-component fibers or co-polyamide systems. As for the synthetic fibers, the materials in which these are based essentially consist of the given materials, as usual they may comprise additional polymeric or additive materials for example softeners, but also different polymers, these additional constituents are normally present in an amount of no more than 5% by weight with respect to the total mass of the fiber base material.

Before treatment with the formulation, the fibers and/or textiles can and are usually treated as is common in textile processing, e.g. by being scoured, bleached, brightened, dyed (with the appropriate after-treatment as is fit for the appropriate dyestuff class applied, like soaping, reduction clearing, oxidation), softened, treated with fixatives (in particular case of cotton with quaternary polyamine systems or in particular case of polyamide with anionic syntans) or whichever other treatment is common for a particular fiber and/or textile.

The invention also relates to treatment liquors comprising a formulation as defined above. Furthermore the present invention relates to a method for treatment of fibers and/or textiles with a formulation as described above, in particular to impart a cool touch effect.

In the context of such a method preferably the fibers and/or textiles are treated by the formulation as given above either by exhausting them in the last bath before drying during a time span of 10 to 40 minutes, preferably in the range of 15 to 30 minutes, at a temperature in the range of 20 to 60° C., preferably at a temperature in the range of 30 to 50° C. or by forced application, e.g. padding or spraying, and subsequent drying.

If the formulation is being applied by forced application it can be combined with the chemicals usually applied during that step like e.g. resins, softeners, stiffeners.

Posttreatment is also possible, it is for example possible subsequent to the treatment with the formulation as given above to subject the fibers and/or textiles to the following post-treatment: Compacting (sanforizing), calendaring, decatizing, raising, emerizing and other mechanical textile treatments as well as condensation of crosslinkers or self-crosslinking polymers if these are applied as well.

Last but not least the present invention relates to a fiber or textile treated with a formulation as detailed above or resulting from a method as defined above. The fiber in the form of a textile can take the form of a garment, article of clothing, including underwear, outerwear, protective clothing, sports clothing.

Further embodiments of the invention are laid down in the dependent claims.

In the following the key effects of the proposed formulations shall be summarized:

Cool to the touch:

Claimed effect 'Cool to the touch' indicates treated fabrics provide a cool temperature on touch contact.

Methods to determine: Forward Looking Infra-Red (FLIR)—dry method; Differential Scanning calorimetry (DSC).

Explanation: The FLIR (dry method) shows that fabric treated with Adaptive AC-06 warms up at a lower rate compared to the untreated fabric. The temperature of the treated fabric also asymptotes at a cooler temperature compared to the untreated fabric.

The DSC data confirms the presence of the active polymer on the surface of the fabrics, through the appearance of endothermic (heat absorbing) peaks at temperatures consistent with the active polymer. The endothermic peak indicates that as temperature increases (eg. through touch) the surface with the polymer will provide an endothermic effect, absorbing heat from the surroundings and therefore providing a cooling effect.

Summary: The 'Cool to the touch' claim is substantiated by the measurement of lower temperature for the treated fabric (FLIR method) and the presence of the endothermic active polymer on the fabric surface (DSC method).

Starts cool, stays cool:

Claimed effect: 'Starts cool, stays cool' indicates a combination of initial and prolonged cooling actions.

Methods: A) Starts Cool
1. Forward Looking Infra-Red (FLIR)—dry method
2. Differential Scanning calorimetry (DSC) (Appendix 3.3)
B) Stays Cool
3. Forward Looking Infra-Red (FLIR)—wet method
4. Dynamic evaporation test Explanation: 'Starts cool' entails the treated fabric provides an initial cooling effect.

The FLIR (dry method) shows that fabric treated with Adaptive AC-06 warms up at a lower rate compared to the untreated fabric. The temperature of the treated fabric also asymptotes at a cooler temperature compared to the untreated fabric.

The DSC data confirms the presence of the active polymer on the surface of the fabrics, through the appearance of endothermic (heat absorbing) peaks at temperatures consistent with the active polymer. The endothermic peak indicates that as temperature increases (eg. through touch) the surface with the polymer will provide an endothermic effect, absorbing heat from the surroundings and therefore providing a cooling effect.

'Stays cool' entails the fabric provides a prolonged cooling action. The prolonged action is associated with cooling from evaporating moisture.

The FLIR (wet method) shows that fabric treated with Adaptive AC-06 and exposed to conditions of evaporating liquid water exhibits a prolonged lower temperature.

Figure 4:
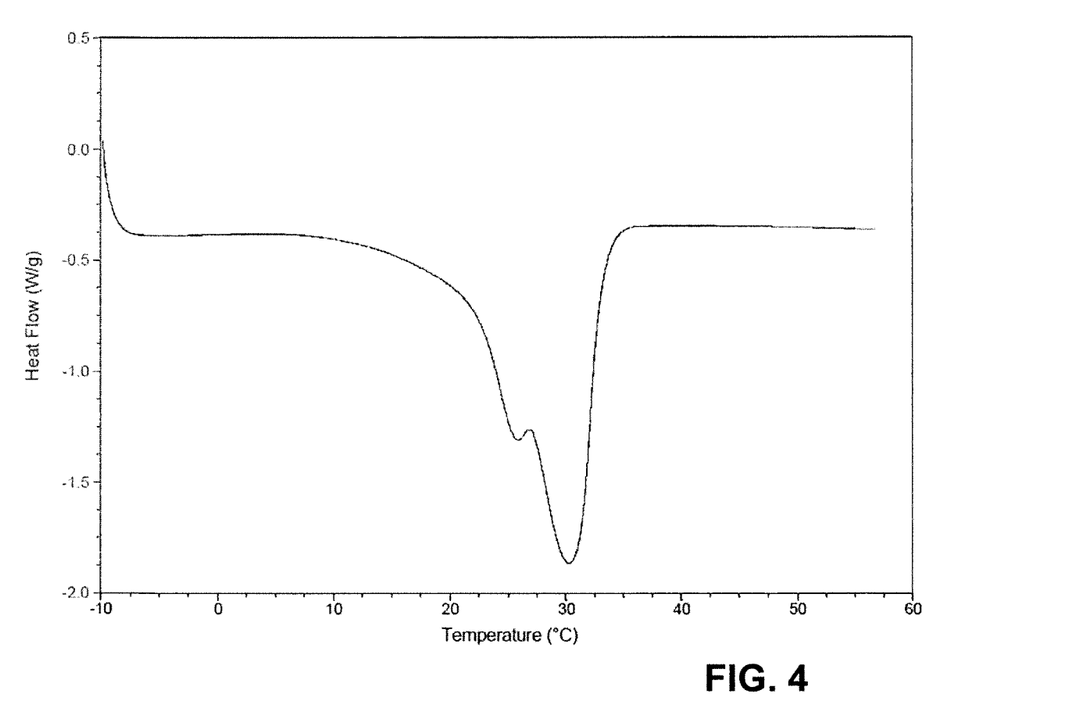
FIG. 4 shows the active component in Adaptive AC-06.

The dynamic evaporation test involves measuring the level of evaporation from samples at two different temperature conditions. The dynamic evaporation test data indicates that the Adaptive AC-06 treated fabric can achieve significant evaporation performance (FIG. 4).

Summary: 'Starts cool' is illustrated by the lower initial temperature of the FLIR (dry) data and the endothermic contact cooling shown by the DSC data.

'Stays cool' is illustrated by moisture evaporation testing through the FLIR (wet) data and the dynamic evaporation test data that are representative of prolonged cooling effect from evaporation of perspiration.

Cool on Contact:

Claimed effect: 'Cool on contact' indicates treated fabrics provide a cool temperature on touch contact.

Methods: 1. Forward Looking Infra-Red (FLIR)—Dry Method

2. Differential Scanning Calorimetry (DSC)

Explanation: The FLIR (dry method) data shows that fabric treated with Adaptive AC-06 warms up at a lower rate compared to the untreated fabric. The temperature of the treated fabric also asymptotes at a cooler temperature compared to the untreated fabric.

The DSC data confirms the presence of the active polymer on the surface of the fabrics, through the appearance of endothermic (heat absorbing) peaks at temperatures consistent with the active polymer. The endothermic peak indicates that as temperature increases (eg. through touch) the surface with the polymer will provide an endothermic effect, absorbing heat from the surroundings and therefore providing a cooling effect.

Summary: The 'Cool on contact' claim is substantiated by the measurement of lower temperature for the treated fabric (FLIR method) and the presence of the endothermic active polymer on the fabric surface (DSC method).

Cooling Activated by Skin Temperature:

Claimed effect: 'Cooling activated by skin temperature' indicates treated fabrics provide a cool temperature when in contact with skin temperature.

Methods: 1. Forward Looking Infra-Red (FUR) Dry Method
2. Differential Scanning Calorimetry (DSC)

Explanation Skin temperature can vary significantly amongst humans depending on environmental conditions, physiology and other factors. In situations where a cooling effect is desired the skin temperature can be assumed to be generally be in a high range, for example between 25 to 30° C. 1.

The FLIR (dry method) data shows that, when placed onto a surface maintained at 36° C., fabric treated with Adaptive AC-06 warms up at a lower rate compared to the untreated fabric. The temperature of the treated fabric also asymptotes at a cooler temperature compared to the untreated fabric.

The DSC data confirms the presence of the active polymer on the surface of the fabrics, through the appearance of endothermic (heat absorbing) peaks at temperatures consistent with the active polymer. The endothermic peak indicates that as temperature increases (eg. through touch) the surface with the polymer will provide an endothermic effect, absorbing heat from the surroundings and therefore providing a cooling effect. The strongest DSC peak occurs at approximately 30° C. which is consistent with a target range for activation by skin temperature.

Summary: The 'Cooling activated by skin temperature' claim is substantiated by the measurement of lower temperature for the treated fabric (FUR method) and the presence of the endothermic active polymer on the fabric surface (DSC method) occurring at approximately 30° C. which is a range that would be activated by skin temperature.

Cools 50% More:

Claimed effect: 'Cools 50% more' than current products.
Methods: 1. Dynamic Evaporation Test Explanation: The Dynamic evaporation test involves measuring the level of evaporation from samples at two different temperature conditions. The dynamic evaporation test data indicates that the Adaptive AC-06 treated fabric can achieve over 50% more dynamic evaporation performance associated with improved cooling.

Summary: The 'Cool 50% more' claim is substantiated by an example of the improved dynamic evaporation performance of AC-06 compared to AC-05.

Cools up to 4.5 F degrees (2.5° C.):

Claimed effect: 'Cools up to 4.5 F degrees (2.5° C.)' indicates a cooling effect capable of achieving a reduced temperature of up to 4.5° F. (2.5° C.).

Methods: 1. Forward Looking Infra-Red (FLIR)—Wet Method

Explanation: The FLIR (wet method) shows that fabric treated with Adaptive AC-06 and exposed to conditions of evaporating liquid water exhibits a prolonged lower temperature. The example shows a temperature of reduction of more than 4.5° F. (2.5° C.). While this is a laboratory simulation rather than human testing, the test method shows the principle of evaporative cooling and potential for significant cooling.

Summary: "Cools up to 4.5 F degrees (2.5° C.)' is illustrated by an example FLIR (wet method) that simulates the cooling potential of water evaporation.

Activated cooling. Cools only when you need it:

Claimed effect: 'Activated cooling. Cools only when you need it.' indicates treated fabrics provide a cooling effect in conditions when cooling is needed.

Methods: 1. Forward Looking Infra-Red (FLIR)—Dry Method

2. Differential Scanning Calorimetry (DSC)

Explanation: The FLIR (dry method) data shows that, when placed in warming conditions (hotplate 36° C.), fabric treated with Adaptive AC-06 warms up at a lower rate compared to the untreated fabric. The temperature of the treated fabric also asymptotes at a cooler temperature compared to the untreated fabric.

The DSC data confirms the presence of the active polymer on the surface of the fabrics, through the appearance of endothermic (heat absorbing) peaks at temperatures consistent with the active polymer. The endothermic peak indicates that as temperature increases (eg. through touch) the surface with the polymer will provide an endothermic effect, absorbing heat from the surroundings and therefore providing a cooling effect.

Summary: The 'Activated cooling. Cools only when you need it' claim is substantiated by a cooler fabric during warming conditions (FLIR dry method) and the presence of the endothermic active polymer on the fabric surface (DSC method) that would be activated in warming conditions when temperature passes ca.30° C.

Active cooling when you need it:

Claimed effect: "Active cooling when you need it' indicates a cooling mechanism activated by conditions when cooling is needed.

Methods: 1. Forward Looking Infra-Red (FLIR)—Wet Method
2. Dynamic Evaporation Test
3. Vertical Wicking (AATCC 179)

Explanation: Cooling when you needed it involves evaporation cooling through effective moisture transport in conditions where perspiration is in contact with the fabric (i.e. conditions when cooling is needed).

The FLIR (wet method) data shows that fabric treated with Adaptive AC-06 and exposed to conditions of evaporating liquid water exhibits a prolonged lower temperature.

The dynamic evaporation test involves measuring the level of evaporation from samples at two different temperature conditions. The dynamic evaporation test data indicates that the Adaptive AC-06 treated fabric can achieve significant evaporation performance (FIG. 4). The vertical wicking (AATCC 179) test shows that the fabrics treated with Adaptive AC-06 effectively transport 'wick' liquid moisture so as to facilitate effective evaporative cooling.

Summary: The 'Activated cooling when you need it' claim is substantiated by evaporative cooling observed when in contact with moisture (FLIR wet method), by the dynamic evaporation test showing effective evaporation, and by the effective moisture transport observed in the vertical wicking test. Evaporative cooling would be emphasized in conditions when cooling is needed such as contact with liquid perspiration.

Any current X-temp claims (eg. wicking):

Claimed effect: Comparability of current (Adaptive AC-05) claims and the new Adaptive AC-06 treatment.

Methods: 1. HeiQ Dynamic Evaporation Test
2. Vertical Wicking (AATCC 179)

Explanation: The Dynamic evaporation test involves measuring the level of evaporation from samples at two different temperature conditions. The dynamic evaporation test data indicates that the Adaptive AC-06 treated fabric can achieve significant evaporation performance that is comparable/better than the AC-05 treatment.

The vertical wicking (AATCC 179) test shows that the fabrics treated with Adaptive AC-06 effectively transport 'wick' liquid moisture so as to facilitate effective evaporative cooling.

Summary: The moisture transport (vertical wicking) and evaporation properties of the Adaptive AC-06 are comparable/better than the prior treatment (AC-05).

FLIR Wet Testing: FLIR E75 thermal camera with ResearchIR Max 4 software; A test specimen is spread on the glass netting on top of a hot plate (30° C.=standard testing temperature for heating effects; 36° C.=standard testing temperature for cooling effects). A metal ring is placed on the test specimen and used to smoothen any initial folds and to fix the test specimen without folds and creases within the ring.

After the fabric has been spread out and is free of folds or creases within the area surrounded by the ring the camera is started to record the data. 100 µl of artificial sweat solution of the same temperature as the hot plate (i.e. 30 or 36° C.) is dropped onto the fabric via the medicinal pipette. It must be made sure that the sweat solution is not touching the hot plate but is only spread within the textile The camera is to record the temperature for 2 minutes.

After the camera is running for 60 seconds the fan is put on.

This way 60 seconds are without fan and 60 seconds are with fan on.

The standard testing area is an ellipse covering the sweat stain on a HeiQ Adaptive AC-06 treated fabric of 2 to 3% (if there is no HeiQ Adaptive AC-06 in the series to be tested another HeiQ Adaptive product at 2 to 3% applied concentration can be used).

The spot is marked with the software at its maximum (after ca. 1 min 30 sec to 2 min). The spot has to be completely covered by the border of the marking area.

Using this standard testing area, the video is started from the beginning and the integrated temperature of the marked area is measured/calculated over time.

The data are manipulated that the start of the evaluation is the video frame the sweat solution touches the test specimen.

The average temperature without fan is determined from the time from 20 to 40 seconds after the start point (i.e. the sweat touches the test specimen).

The average temperature with fan is determined from the time from 80 to 100 seconds after the start point (i.e. the sweat touches the test specimen).

Adaptive Evaporation Test:

is designed to characterize evaporation properties of a fabric at two different temperature and humidity settings. The Adaptive evaporation performance is assessed based on a combination of properties at both conditions.

Target Properties

A fabric showing good Adaptive evaporation performance is expected to show the following properties:

1. High evaporation at warm conditions—giving a high degree of cooling.
2. Moderate evaporation at cool conditions—avoid excessive cooling or chilling when not desired.

The Adaptive evaporation test gives a systematic framework to assess these properties.

Method Summary

A fabric is held in contact with a saturated substrate of defined area and water content.

The mass of water loss due to evaporation from the fabric is measured at two different climate settings of temperature and humidity (20° C./65% RH and 35° C./30% RH).

The rate of evaporation for each condition is calculated and compared relative to the saturated reference substrate without fabric. —For thick fabrics, e.g. socks, a sub-norm using an adopted, different reference system is used.

A performance metric "P" is calculated to give a single objective measure of dynamic evaporation performance. The value of "P" is reported in percent.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Preferred embodiments of the invention are described in the following with reference to the examples, which are for the purpose of illustrating the present preferred embodiments of the invention and not for the purpose of limiting the same.

Experiments 1:

Formulation 1 (Comparative Example)

Figure 1:
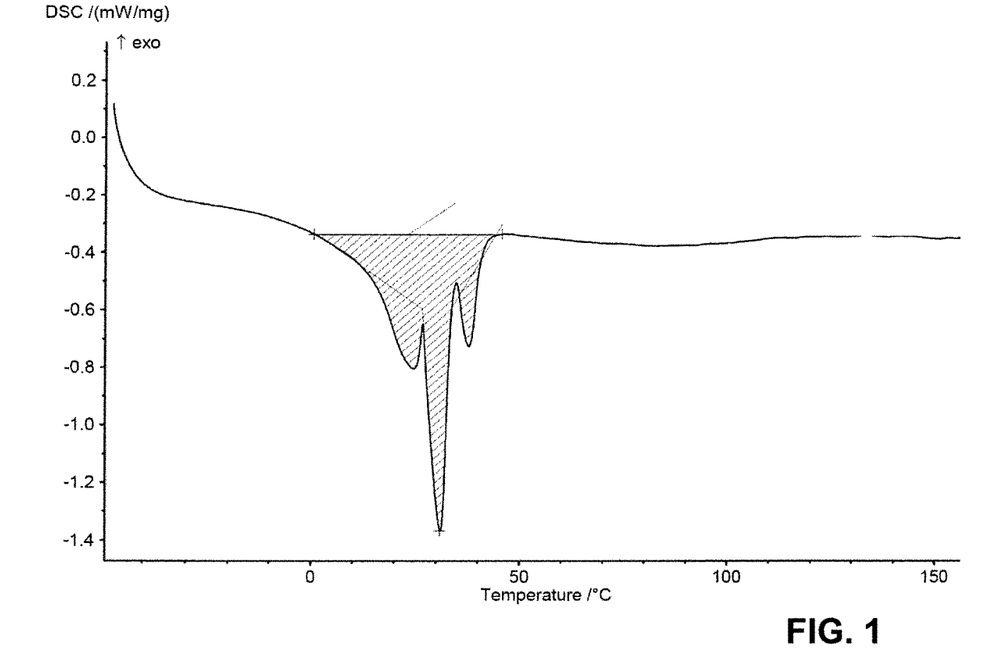
FIG. 1 shows a DSC of PPG/PEG block-copolymer of 20EO-17PO-20EO of formulation 1 (heating, peak value 31° C., onset below 0° C., end at 48° C., trimodal)

800 g of a PPG/PEG block-copolymer of 20EO-17PO-20EO, molten at 40° C., is added to 200 g of warm (25 to 30° C.) water. After stirring a homogeneous, transparent solution is obtained. The DSC of the PPG/PEG block-copolymer of 20EO-17PO-20EO as such is given in FIG. 1. It essentially corresponds to the DSC of the fibres according to Textile treatment 1 below.

Formulation 2

Figure 2:
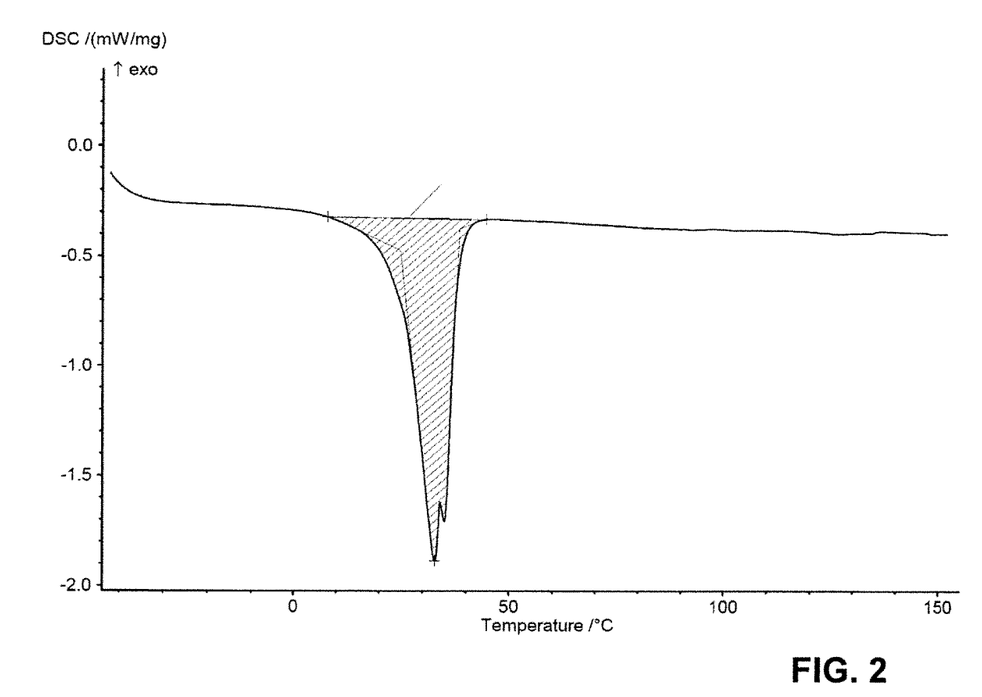
FIG. 2 shows a DSC of PPG/PEG block-copolymer of 9PO-41EO-9PO of Formulation 2 (heating, peak value 32.8° C., onset 4° C., end at 38.5° C., bimodal)

800 g of a PPG/PEG block-copolymer of 9PO-41EO-9PO (corresponding essentially to a Meroxapol 106), molten at 40° C., is added to 200 g of warm (25 to 30° C.) water. After stirring a homogeneous, transparent solution is obtained. The DSC of the PPG/PEG block-copolymer of 9PO-41EO-9PO as such is given in FIG. 2. It essentially corresponds to the DSC of the fibres according to Textile treatment 2 below.

Formulation 3

Figure 3:
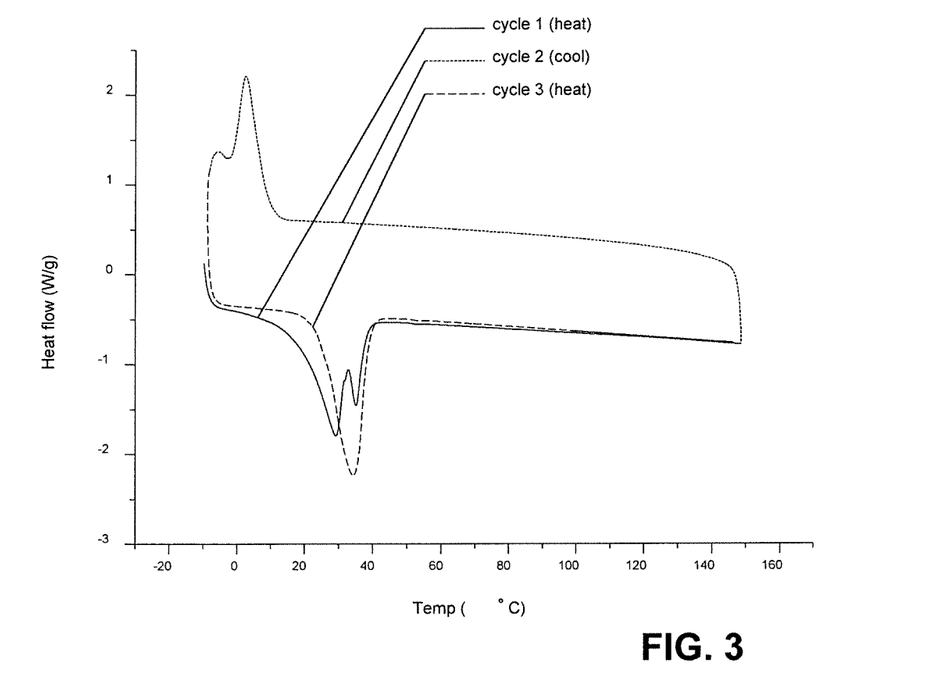
FIG. 3 shows a DSC of PPG/PEG block-copolymer one side end-capped with butanol of Formulation 3.

800 g of a PPG/PEG block-copolymer of 9PO-41EO-9PO (corresponding essentially to a Meroxapol 106), one side end-capped with butanol, molten at 40° C., is added to 200 g of warm (25 to 30° C.) water. After stirring a homogeneous, transparent solution is obtained. The DSC of the PPG/PEG block-copolymer of 9PO-41EO-9PO one side end-capped with butanol as such is given in FIG. 3. It essentially corresponds to the DSC of the fibres according to Textile treatment 3 below.

Formulation 4

600 g of Formulation 2 is added to 400 g of a low formaldehyde glyoxal resin of 60% solid content. After stirring a homogeneous, transparent solution is obtained.

Formulation 5

700 g of Formulation 2 is added to 300 g of a blocked isocyanate emulsion. After stirring a homogeneous, white solution/emulsion is obtained.

Textile Treatment 1:

A polyester woven fabric is padded with a treatment liquor containing 150 g/l Formulation 1 and 1 ml/l acetic acid 25%, squeezed to 50% pick-up and dried for 2 minutes at 120° C. No cool touch feel is obtained (−/o on a scale of −−/−/o/+/++).

Textile Treatment 2:

A polyester woven fabric is padded with a treatment liquor containing 150 g/l Formulation 2 and 1 ml/l acetic acid 25%, squeezed to 50% pick-up and dried for 2 minutes at 120° C. A strong cool touch feel is obtained (++ on a scale of −−/−/o/+/++).

Textile Treatment 3:

A polyester knitted fabric is padded with a treatment liquor containing 150 g/l Formulation 3 and 1 ml/l acetic acid 25%, squeezed to 50% pick-up and dried for 2 minutes at 120° C. A strong cool touch feel is obtained (+/++ on a scale of −−/−/o/+/++).

Textile Treatment 4:

T-shirts made of polyester are immersed in a treatment liquor containing 15% Formulation 2 and 0.3 mill acetic acid 25% and treated at 40° C. for 20 minutes and a liquor ratio of 1 to 8. Then the T-shirts are hydroextracted and dried at 80° C. in a tumble drier. A very strong cool touch feel is obtained (++ on a scale of −−/−/o/+/++).

Textile Treatment 5:

A cotton knitted fabric is padded with a treatment liquor containing 150 g/l Formulation 2 and 1 ml/l acetic acid 25%, squeezed to 65% pick-up and dried for 2 minutes at 120° C. No cool touch feel is obtained (−/o on a scale of −−/−/o/+/++).

Textile Treatment 6:

A cotton knitted fabric that has been treated with 4% quaternary polyamine fixative (Hydrocol SUN, Rudolf Chemie, Geretsried, Germany) at 40° C. for 30 minutes at a pH of 4 and a liquor ratio of 1:8, rinsed, hydroextracted and dried at 120° C. for 2 minutes, is padded with a treatment liquor containing 150 g/l Formulation 2 and 1 ml/l acetic acid 25%, squeezed to 65% pick-up and dried for 2 minutes at 120° C. A cool touch feel is obtained (+/++ on a scale of −−/−/o/+/++).

Textile Treatment 7:

A cotton knitted fabric is padded with a treatment liquor containing 150 g/l Formulation 3 and 1 ml/l acetic acid 25%, squeezed to 65% pick-up and dried for 2 minutes at 120° C. A strong cool touch feel is obtained (+/++ on a scale of −−/−/o/+/++).

Textile Treatment 8:

A cotton woven fabric is padded with a treatment liquor containing 250 g/l Formulation 3, 25 g/l Magnesium chloride hexahydrate, 20 g/l silicone microemulsion softener (HeiQ Soft CSE) and 1 ml/l acetic acid 25%, squeezed to 65% pick-up and dried for 2 minutes at 120° C. and cured for 5 min at 150° C. A strong cool touch feel is obtained (+/++ on a scale of −−/−/o/+/++).

The fabric is washed 5 and 10 times as per ISO 6330:2012 4N (40° C. wash with mechanic), line dried; then the cool effect is checked again and is still present (+/++ resp. + on a scale of −−/−/o/+/++).

Textile Treatment 9:

A cotton woven fabric is padded with a treatment liquor 200 g/l Formulation 3, 20 g/l silicone microemulsion softener (HeiQ Soft CSE) and 1 ml/l acetic acid 25%, squeezed to 65% pick-up and dried for 2 minutes at 120° C. and cured for 2 min at 160° C. A strong cool touch feel is obtained (+/++ on a scale of −−/−/o/+/++).

The fabric is washed 5 and 10 times as per ISO 6330:2012 4N (40° C. wash with mechanic), line dried; then the cool effect is checked again and is still present (+/++ resp. + on a scale of --/-/o/+/++).

The measurements were taken in accordance with the following standard and on the following test specimens.

The melting points (Tm) were determined to ISO 11357. The heating rate used for differential scanning calorimetry (DSC) was 10K/min. The temperature for the maximum peak is specified for the melting point (Tm).

Cool-touch effect: the effect was determined using hand feel. Surprisingly the melting effect seen in the DSCs of the products alone or even applied on polyester garments does not correlate to the hand feel! On cellulose fibers no effect was noticeable with DSC at all.

Experiments 2:

Formulation 1 (Concentrated Version):

800 g of a PPG/PEG block-copolymer of 9PO-41EO-9PO (corresponding essentially to a Meroxapol 106), one side end-capped with butanol (=Adaptive AC-06 AS; AS=Active Substance), molten at 40° C., is added to 200 g of warm (25 to 30° C.) water. After stirring a homogeneous, transparent solution is obtained.

Formulation 2 (Diluted Version=Adaptive AC-06):

250 g of Formulation 1 is added to 748.5 g of demineralized water, stirring for 5 minutes, adding 1.5 g Acticide MBS 50/50 (preservative, active ingredients: 1,2-Benzisothiazolin-3-one, 2.5%; 2-Methyl-4-isothiazolin-3-one, 2.5%). After stirring a homogeneous, transparent solution is obtained.

Textile Treatment 1, LS18-00696-4-1:

A polyester knitted fabric is padded with a treatment liquor containing 750 g/l Formulation 1 and 1 ml/l acetic acid 25%, squeezed to 50% pick-up and dried for 2 minutes at 120° C. (corresponds to 30% active substance on the fabric after the application)

Textile Treatment 2, LS18-00696-5-1:

A polyester knitted fabric is padded with a treatment liquor containing 500 g/l Formulation 1 and 1 ml/l acetic acid 25%, squeezed to 50% pick-up and dried for 2 minutes at 120° C. (corresponds to 20% active substance on the fabric after the application)

Textile Treatment 3, LS18-00696-6-1:

A polyester knitted fabric is padded with a treatment liquor containing 250 g/l Formulation 1 and 1 ml/l acetic acid 25%, squeezed to 50% pick-up and dried for 2 minutes at 120° C. (corresponds to 10% active substance on the fabric after the application)

Textile Treatment 4, LS18-00696-7-1:

A polyester knitted fabric is padded with a treatment liquor containing 83.3 g/l Formulation 1 and 1 ml/l acetic acid 25%, squeezed to 50% pick-up and dried for 2 minutes at 120° C. (corresponds to 3% active substance on the fabric after the application)

Textile Treatment 5, LS18-00696-8-1:

A polyester knitted fabric is padded with a treatment liquor containing 25 g/l Formulation 1 and 1 ml/l acetic acid 25%, squeezed to 50% pick-up and dried for 2 minutes at 120° C. (corresponds to 1% active substance on the fabric after the application).

Cotton jersey samples were treated analogously leading to samples LS18-00695-6-1-LS18-00695-10-1.

Cotton jersey cationized samples were treated analogously leading to samples LS18-00695-11-1-LS18-00695-15-1.

UT stands for untreated textiles.

The samples are summarized in the following table:

| | | | |
|---|---|---|---|
| 1 | HeiQ Adaptive AC-06 | Liquid | Adaptive AC-06 formulation for textile treatment |
| 2 | Active in Adaptive AC-06 | Solid | Active component in Adaptive AC-06 |
| 3 | LS18-00696-3-1 | Fabric | JE1400 100% PES jersey knit - UT |
| 4 | LS18-00696-4-1 | Fabric | JE1400 100% PES jersey knit + 30% Polymer |
| 5 | LS18-00696-5-1 | Fabric | JE1400 100% PES jersey knit + 20% Polymer |
| 6 | LS18-00696-6-1 | Fabric | JE1400 100% PES jersey knit + 10% Polymer |
| 7 | LS18-00696-7-1 | Fabric | JE1400 100% PES jersey knit + 3% Polymer |
| 8 | LS18-00696-8-1 | Fabric | JE1400 100% PES jersey knit + 1% Polymer |
| 9 | LS18-00695-1-1 | Fabric | 2417 100% cotton jersey (136 gsm); UT |
| 10 | LS18-00695-5-1 | Fabric | 2417 100% cotton jersey (136 gsm) - cationized; UT |
| 11 | LS18-00695-6-1 | Fabric | 2417 100% cotton jersey - 30% polymer |
| 12 | LS18-00695-7-1 | Fabric | 2417 100% cotton jersey - 20% polymer |
| 13 | LS18-00695-8-1 | Fabric | 2417 100% cotton jersey - 10% polymer |
| 14 | LS18-00695-9-1 | Fabric | 2417 100% cotton jersey - 3% polymer |
| 15 | LS18-00695-10-1 | Fabric | 2417 100% cotton jersey - 1% polymer |
| 16 | LS18-00695-11-1 | Fabric | 2417 100% cotton jersey - cationized - 30% polymer |
| 17 | LS18-00695-12-1 | Fabric | 2417 100% cotton jersey - cationized - 20% polymer |
| 18 | LS18-00695-13-1 | Fabric | 2417 100% cotton jersey - cationized - 10% polymer |
| 19 | LS18-00695-14-1 | Fabric | 2417 100% cotton jersey - cationized - 3% polymer |
| 20 | LS18-00695-15-1 | Fabric | 2417 100% cotton jersey - cationized - 1% polymer |

Methods

Testing was performed using a DSC Q200 system (TA instruments). An empty pan was used as the reference.

DSC tests were conducted in single-pass mode (heating) with a temperature range of −10° C. to 60° C. under an inert (nitrogen) atmosphere.

The heating rate was 10° C./minute.

All samples were tested using hermetically sealed aluminium pans.

DSC curves were acquired during a single cool-heat cycle.

Results

The active component (sample #2) and the formulated active (sample #1; HeiQ Adaptive AC-06) were tested. DSC traces are shown in FIG. 4 and FIG. 5.

The DSC trace for the active FIG. 4 shows a primary endothermic peak at 30° C. and a secondary peak at 26° C.

Figure 5:
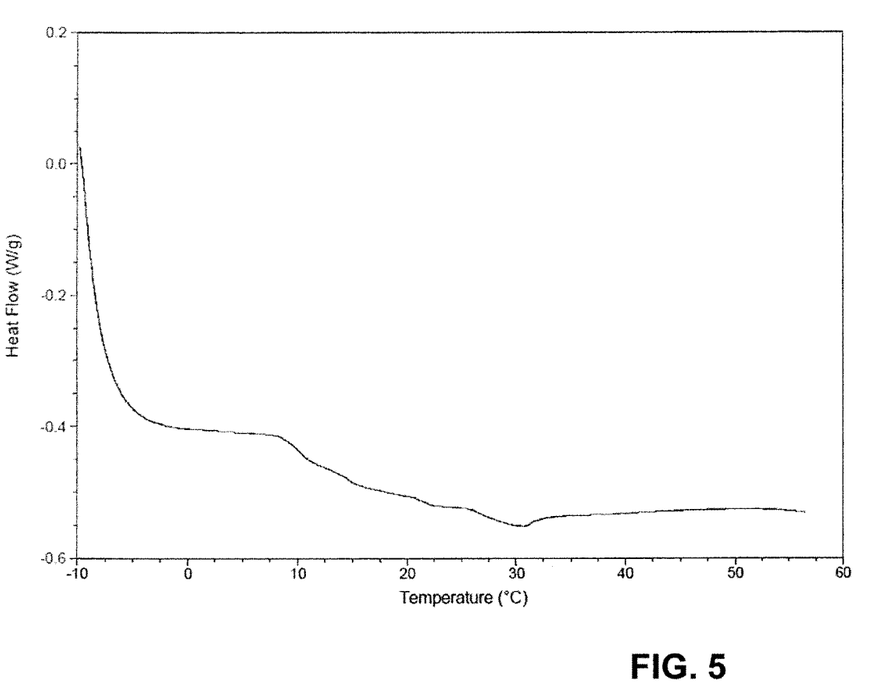
FIG. 5 shows the adaptive AC-06 formulation containing the active component.

The DSC trace for the HeiQ Adaptive AC-06 formulation (containing the active) in FIG. 5 shows the presence of the characteristic endothermic peaks of the active substance at 30° C. and 26° C.

Polyester Fabrics

Figure 6:
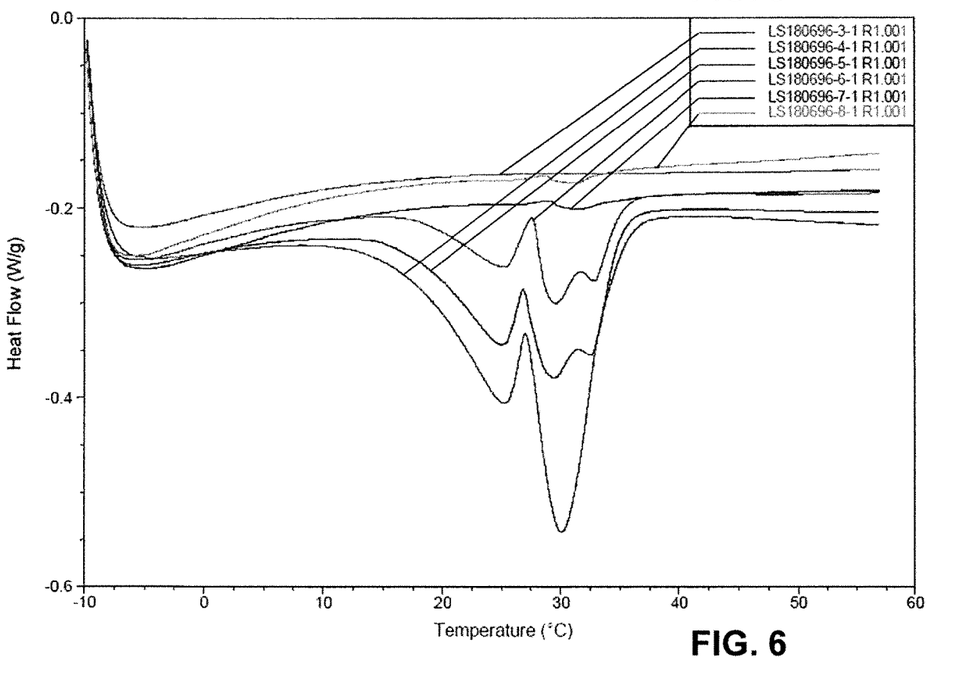
FIG. 6 shows DSC traces for the 100% polyester knit fabric samples.

DSC traces for the 100% polyester knit fabrics are shown in FIG. 6.

The untreated reference fabric (LS180696-3) does not show the characteristic peaks of the active substance.

The samples LS180696-4 through to -6 clearly show characteristic peaks of the active substance. Samples LS180696-5 and -6 show an additional peak at ca. 32° C.

Samples LS180696-7 and -8 show diminished peaks at the expected positions for the active substance.

Cotton Fabrics (Non-Cationized)

Figure 7:
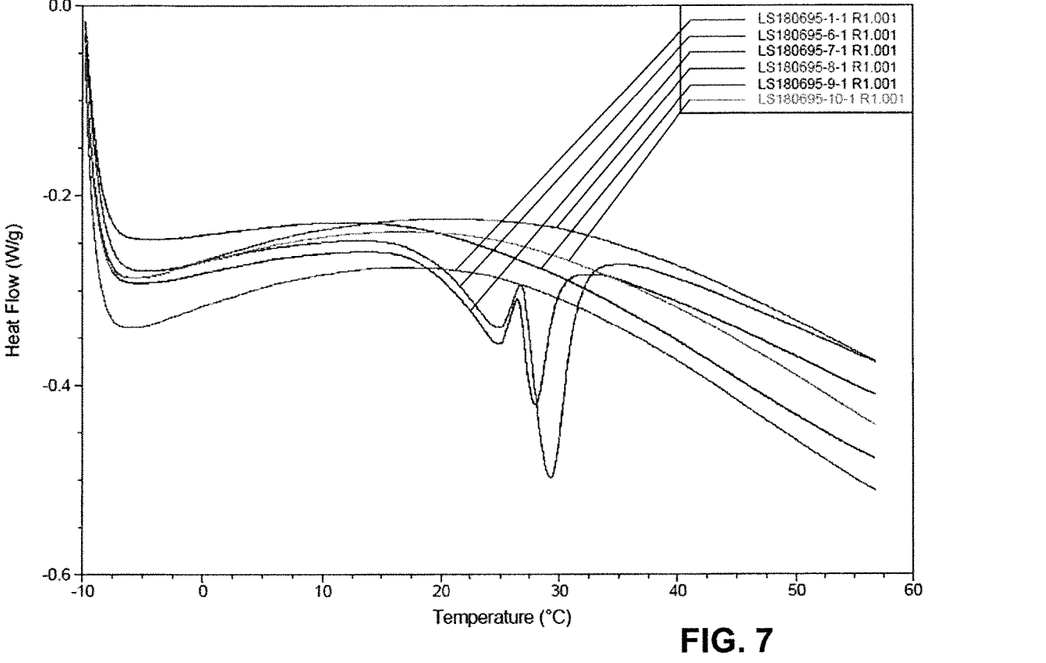
FIG. 7 shows DSC traces for the 100% cotton knit fabric (non-cationized) samples.

DSC traces for the 100% cotton knit fabrics (non-cationized) are shown in FIG. 7.

The untreated reference fabric (LS180695-1) and also samples LS180695-8, -9 and -10 do not show the characteristic peaks of the active substance.

Samples LS18-0695-6 and -7 show characteristic peaks of the active substance. The peak positions are shifted to slightly lower temperatures compared to the active substance reference.

Cationized Cotton Fabrics

Figure 8:
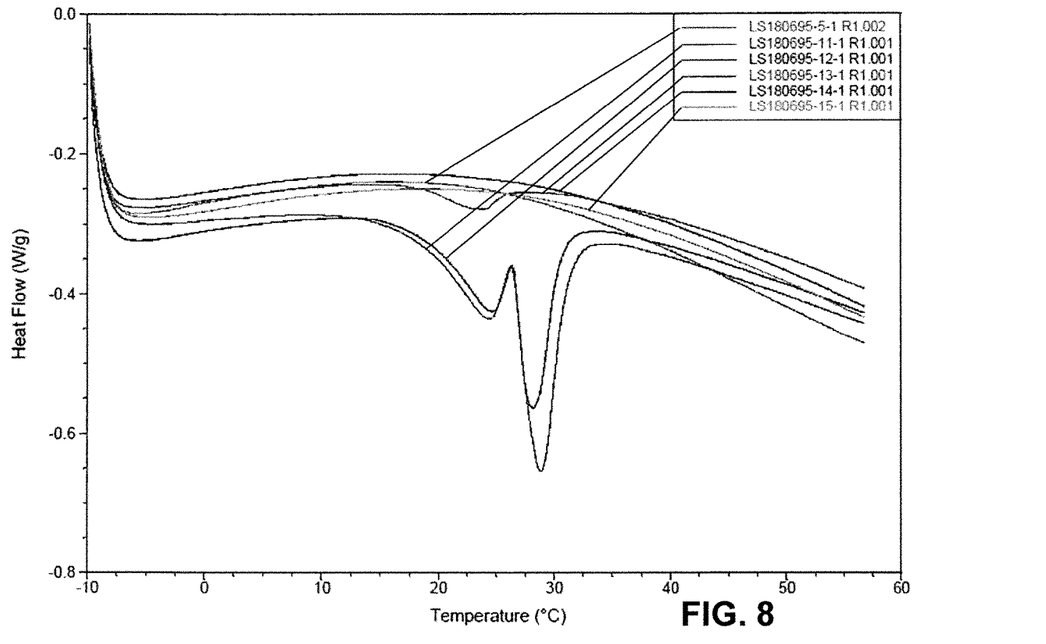
FIG. 8 shows DSC traces for the 100% cotton knit fabric (cationized) samples.

DSC traces for the 100% cotton knit fabrics (cationized) are shown in FIG. 8.

The untreated reference fabric (LS180695-5) and also samples LS180695-14 and -15 do not show the characteristic peaks of the active substance.

Samples LS18-0695-11, -12 and -13 show characteristic peaks of the active substance. The peak positions are shifted to slightly lower temperatures compared to the active substance reference. Sample LS18-0695-13 shows only one of the expected peaks (at ca.24° C.).

The invention claimed is:

1. A textile treatment formulation comprising a PPG/PEG block-copolymer of Formula (I) or a mixture thereof:

Formula (I)

wherein an average value of x is in a range of 38-42;

an average value of y is in a range of 6-11, wherein a value of y in the left and in the right structural moiety as represented above can be different but within that range;

R' and R" are selected, independently from each other, from the group consisting of: hydrogen, and saturated or at least partly unsaturated linear, cyclic or branched hydrocarbon chain with 1-18 carbon atoms, in which one or more carbon atoms can be replaced by a heteroatom selected from the group consisting of: nitrogen, oxygen, and sulfur;

and wherein the PPG/PEG block-copolymer of Formula (I) has a DSC-melting point (peak value) according to DIN ISO 11357 in a range of 15-37° C.

2. The textile treatment formulation according to claim 1, wherein the average value of y is in the range of 7-10.

3. The textile treatment formulation according to claim 1, wherein R' and R" are selected, independently from each other, from the group consisting of: hydrogen, and saturated or at least partly unsaturated linear, cyclic or branched hydrocarbon chain with 1-6 carbon atoms.

4. The textile treatment formulation according to claim 1, wherein R' and R" are selected, independently from each other, from the group consisting of: hydrogen and n-butyl.

5. The textile treatment formulation according to claim 1, wherein the PPG/PEG block-copolymer of Formula (I) has a DSC-melting point according to DIN ISO 11357 in the range of 20-35° C., and/or wherein the onset of the peak in the DSC is below 0° C., and/or wherein the end of the peak in the DSC is below 50° C., and/or wherein the full width at half height of the peak is smaller than 20° C., and/or wherein the peak in the DSC is bimodal or monomodal.

6. The textile treatment formulation according to claim 1, wherein the total average molecular weight of the PPG/PEG block-copolymer of Formula (I) is in the range of 2500-3200 Da.

7. The textile treatment formulation according to claim 1, wherein the PPG/PEG block-copolymer of Formula (I) is present in the formulation in an unencapsulated form.

8. The textile treatment formulation according to claim 1, wherein the PPG/PEG block-copolymer of Formula (I) is present in the formulation in a concentration in the range of 50-850 g/l, and/or wherein the formulation is free from curing agents so that after drying of a correspondingly coated fiber no curing step is necessary.

9. A method of using a formulation according to claim 1 or of using a treatment liquor comprising a formulation according to claim 1 for coating of fibers and/or textiles, comprising coating fibers or textiles with the formulation or the treatment liquor.

10. The method according to claim 9, wherein before treatment with the formulation, the fibers and/or textiles are treated with a softener formulation and/or cationic fixer formulation.

11. A method of treating fibers and/or textiles, comprising applying a textile treatment formulation according to claim 1 or a treatment liquor comprising a formulation according to claim 1 to fibers and/or textiles.

12. The method according to claim 11, wherein the fibers and/or textiles are treated for 10 to 40 minutes at a temperature in the range of 20 to 60° C. or by forced application.

13. The method according to claim 11, wherein subsequent to the treatment with the formulation according to claim 1, the fibers and/or textiles are dried and subjected to at least one of the following post-treatments after drying: compacting, calendaring, decatizing, raising, emerizing, and condensation of crosslinkers or self-croslinking polymers.

14. A fiber or textile treated with a formulation according to claim 1.

15. The textile treatment formulation according to claim 1, wherein the average value of x is in the range of 39-41.

16. The textile treatment formulation according to claim 1, wherein the average value of y is in the range of 8-9, and wherein the values of y in the left and in the right structural moiety as represented above are the same.

17. The textile treatment formulation according to claim 1, wherein x is 41 and y is 9.

18. A textile treatment formulation comprising a PPG/PEG block-copolymer of Formula (I) or a mixture thereof:

Formula (I)

wherein
an average value of x is in a range of 27-63;
an average value of y is in a range of 6-11, wherein a value of y in the left and in the right structural moiety as represented above can be different but within that range;
R' and R" are selected, independently from each other, from the group consisting of:
hydrogen, and saturated or at least partly unsaturated linear, cyclic or branched hydrocarbon chain with 1-18 carbon atoms, in which one or more carbon atoms can be replaced by a heteroatom selected from the group consisting of: nitrogen, oxygen, and sulfur;
wherein the PPG/PEG block-copolymer of Formula (I) has a DSC-melting point (peak value) according to DIN ISO 11357 in a range of 15-37° C., and
wherein R' and R" are selected from the group consisting of: methyl, ethyl, n-propyl, iso-propyl, n-butyl, iso-butyl, sec-butyl, tert-butyl, n-pentyl, 2-pentyl, 3-pentyl, 2-methylbutyl, 3- methylbutyl, 3-methylbut-2-yl, 2-methylbut-2-yl, and 2,2-dimethylpropyl.

19. The textile treatment formulation according to claim 18, wherein the average value of x is in the range of 38-42.

20. The textile treatment formulation according to claim 1, wherein R' is selected to be n-butyl and R" is selected to be hydrogen.

21. The textile treatment formulation according to claim 1, wherein the PPG/PEG block-copolymer of Formula (I) has a DSC-melting point according to DIN ISO 11357 in the range of 25-33° C., and/or
wherein the end of the peak in the DSC is below 45° C.; and/or
wherein the full width at half height of the peak is smaller than 15° C.

22. A textile treatment formulation comprising a PPG/PEG block-copolymer of Formula (I) or a mixture thereof:

Formula (I)

wherein
an average value of x is in a range of 27-63;
an average value of y is in a range of 6-11, wherein a value of y in the left and in the right structural moiety as represented above can be different but within that range;
R' and R" are selected, independently from each other, from the group consisting of:
hydrogen, and saturated or at least partly unsaturated linear, cyclic or branched hydrocarbon chain with 1-18 carbon atoms, in which one or more carbon atoms can be replaced by a heteroatom selected from the group consisting of: nitrogen, oxygen, and sulfur;
wherein the PPG/PEG block-copolymer of Formula (I) has a DSC-melting point (peak value) according to DIN ISO 11357 in a range of 15-37° C., and wherein the total average molecular weight of the PPG/PEG block-copolymer of Formula (I) is in the range of 2750-3000 Da, and wherein when R' is selected to be n-butyl and R" is selected to be hydrogen, the average molecular weight is in the range of 2750-2950 Da, and when R'=R" and selected to be n-butyl the average molecular weight is in the range of 2800-3000 Da.

23. The textile treatment formulation according to claim 1, wherein the PPG/PEG block-copolymer of Formula (I) is present in the formulation, in the form of an aqueous dispersion and/or solution, in a concentration in the range of 100-810 g/l.

24. The method according to claim 9, wherein the fibers and/or textiles are based on cotton, hemp, flax, lyocell, rayon, jute, wool, polyester, polyamide, modacrylic, olefinic, acrylic, or a mixture and/or blend thereof, to impart a cool touch effect.

25. The method according to claim 9, wherein before treatment with the formulation, the fibers and/or textiles, comprise cotton and are treated with a softener formulation and/or cationic fixer formulation, based on quaternary polyamine systems.

26. The method according to claim 11, wherein the fibers and/or textiles are based on cotton, hemp, flax, lyocell, rayon, jute, wool, polyester, polyamide, modacrylic, olefinic, acrylic, or a mixture and/or blend thereof.

27. The method according to claim 11, wherein the fibers and/or textiles are treated during a time span of 15 to 30 minutes, at a temperature in the range of 30 to 50° C.

28. The fiber or textile according to claim 14, wherein the fiber or textile is in the form of a garment, or article of clothing.

29. A textile treatment formulation comprising a PPG/PEG block- copolymer of Formula (I) or a mixture thereof:

Formula (I)

wherein
an average value of x is in a range of 27-63;
an average value of y is in a range of 6-11, wherein a value of y in the left and in the right structural moiety as represented above can be different but within that range;
R' and R" are selected, independently from each other, from the group consisting of:
hydrogen, and saturated or at least partly unsaturated linear, cyclic or branched hydrocarbon chain with 1-18 carbon atoms, in which one or more carbon atoms can be replaced by a heteroatom selected from the group consisting of: nitrogen, oxygen, and sulfur; with the proviso that both R' and R" cannot at the same time be selected as hydrogen;
and wherein the PPG/PEG block-copolymer of Formula (I) has a DSC-melting point (peak value) according to DIN ISO 11357 in a range of 15-37° C.

* * * * *